US011210363B1

(12) United States Patent
Gao et al.

(10) Patent No.: US 11,210,363 B1
(45) Date of Patent: Dec. 28, 2021

(54) MANAGING PREFETCHING OF CONTENT FROM THIRD PARTY WEBSITES BY CLIENT DEVICES BASED ON PREDICTION OF USER INTERACTIONS

(71) Applicant: Facebook, Inc., Menlo Park, CA (US)

(72) Inventors: Dihong Gao, Union City, CA (US); Xin Liu, Belmont, CA (US); Xiaojun Liang, San Jose, CA (US); Asad K. Awan, San Francisco, CA (US); Junfeng Pan, Santa Clara, CA (US); Rohan Kuruvilla, San Francisco, CA (US); Yining Wu, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 340 days.

(21) Appl. No.: 15/963,250

(22) Filed: Apr. 26, 2018

(51) Int. Cl.
*G06F 16/958* (2019.01)
*G06N 5/02* (2006.01)
*H04L 29/08* (2006.01)

(52) U.S. Cl.
CPC ............ *G06F 16/958* (2019.01); *G06N 5/02* (2013.01); *H04L 67/146* (2013.01); *H04L 67/20* (2013.01); *H04L 67/2847* (2013.01)

(58) Field of Classification Search
CPC ......... G06F 16/958; G06N 5/02; H04L 67/20; H04L 67/2847
See application file for complete search history.

(56) References Cited

U.S. PATENT DOCUMENTS

| | | | |
|---|---|---|---|
| 6,098,064 A | 8/2000 | Pirolli et al. | |
| 6,487,541 B1 * | 11/2002 | Aggarwal | G06Q 30/02 705/14.4 |
| 7,685,232 B2 * | 3/2010 | Gibbs | G06Q 30/02 709/203 |
| 8,447,837 B2 | 5/2013 | Devanneaux et al. | |
| 9,460,451 B2 * | 10/2016 | Ruiz | G06Q 30/00 |
| 2003/0093476 A1 | 5/2003 | Syed | |
| 2003/0225777 A1 * | 12/2003 | Marsh | H04N 21/4755 |
| 2004/0064577 A1 | 4/2004 | Dahlin et al. | |
| 2009/0049091 A1 * | 2/2009 | Slaney | G06F 16/48 |
| 2010/0042734 A1 | 2/2010 | Olafsson et al. | |

(Continued)

OTHER PUBLICATIONS

United States Office Action, U.S. Appl. No. 15/963,260, dated Feb. 6, 2020, 18 pages.

(Continued)

*Primary Examiner* — Miranda Le
(74) *Attorney, Agent, or Firm* — Fenwick & West LLP

(57) ABSTRACT

An online system provides content items including URLs of third party websites to client devices. The client devices prefetch data from the third party website via the URL. The online system controls the prefetch rate for the client devices based on information received from the client devices. The online system may reduce the prefetch rate if an aggregate number of prefetches from the third party website during a time interval exceeds a prefetch quota. The online system may reduce the prefetch rate if the client devices indicate poor performance of the third party. The online system may determine whether to prefetch data from a URL included in a content item based on a likelihood of the user ignoring the content item if here is a delay in loading of the content item in the client device.

17 Claims, 8 Drawing Sheets

(56) References Cited

U.S. PATENT DOCUMENTS

| | | | |
|---|---|---|---|
| 2014/0172567 A1* | 6/2014 | Manoogian | G06Q 30/0251 705/14.54 |
| 2014/0189036 A1 | 7/2014 | Bhatia et al. | |
| 2014/0282636 A1 | 9/2014 | Petander et al. | |
| 2014/0324579 A1* | 10/2014 | Macadaan | H04L 67/22 705/14.53 |
| 2015/0089014 A1 | 3/2015 | Niemeijer | |
| 2015/0193626 A1 | 7/2015 | Makofsky et al. | |
| 2016/0359988 A1 | 12/2016 | Kazerani et al. | |
| 2016/0381508 A1 | 12/2016 | Zhang | |
| 2017/0201901 A1 | 7/2017 | Zhao | |
| 2018/0255093 A1 | 9/2018 | Doron et al. | |

OTHER PUBLICATIONS

United States Office Action, U.S. Appl. No. 15/963,260, dated Aug. 7, 2020, 18 pages.
United States Office Action, U.S. Appl. No. 15/963,255, dated Apr. 16, 2020, 15 pages.

* cited by examiner

US 11,210,363 B1

MANAGING PREFETCHING OF CONTENT FROM THIRD PARTY WEBSITES BY CLIENT DEVICES BASED ON PREDICTION OF USER INTERACTIONS

BACKGROUND

This disclosure relates generally to newsfeeds at online systems, and more particularly to prefetching of content items from third party websites by client devices receiving newsfeed from the online system.

Online systems have become increasingly prevalent in digital content distribution and consumption, and allow users to more easily communicate with one another. Users of an online system associate with other online system users, forming a web of connections. Additionally, users can have access to personal information and other stories shared by other users connected to them via an online system. For example, shared stories can be provided to a client device of a user as content items in newsfeeds presented to the user. The content items often include links to webpages of third party websites. Users of the online system access the third party websites via the links provided in the content item distributed by the online system.

Client devices sometimes prefetch webpages from the third party websites in anticipation that the user will access a link in a content item that is directed to the third party website. However, the client device may prefetch data for several web pages that the user may not be interested in. Given that an online system may distribute the same link to a large number of users, web pages may be prefetched from a third party websites by a large number of client devices even if very few users receiving the webpage may actually click on the link. Therefore, current prefetching techniques may cause unnecessary traffic to third party websites thereby causing these websites to show poor performance or crash.

SUMMARY

An online system sends content items to client devices of users of the online system, for example, as newsfeed. The content items may include uniform resource locations (URL) of third party websites. A client device prefetches data from third party websites by accessing the URL included in a content item. The online system controls the prefetch rate of client devices that access a third party website via URLs included in content items, for example, to avoid overloading the third party website. In an embodiment, the online system sends prefetch instructions to the client device to control the rate at which the client device prefetches data from a particular third party website.

To generate a prefetch instruction for the client device associated with the target user, the online system determines a first measure of likelihood of the target user performing a user interaction associated with the content item, for example, accessing the particular third party website via the URL in the content item. The online system further determines a second measure of likelihood that the target user would perform less than a threshold amount of activities with the particular third party website after accessing the website, e.g., a likelihood of the target user bouncing from the particular third party website. The online system determines the two measures of likelihood based on information received from the client device. For example, the online system receives, from the client device, information describing past interactions of the target user with the particular third party website and information describing one or more characteristics of the client device. In an embodiment, the online system inputs a first set of features including the past interactions into a first machine learning based model that outputs the first measure of likelihood. Also, the online system inputs a second set of features including the characteristics of the client device into a second machine learning based model that outputs the second measure of likelihood.

The online system generates a prefetch instruction based on the first and second measures of likelihood. For example, the online system generates a prefetch instruction to prefetch data from the particular third party website, after determining that the first measure of likelihood exceeds a first threshold value (e.g., the likelihood of the target user clicking on the URL of the third party website is beyond the first threshold value). As another example, the online system generates a prefetch instruction to prefetch data from the particular third party website, after determining that the second measure of likelihood exceeds a second threshold value (e.g., the likelihood of the target user bouncing from the third party website is beyond the second threshold value). The prefetch instruction is sent to the client device, e.g., along with the identified content item.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
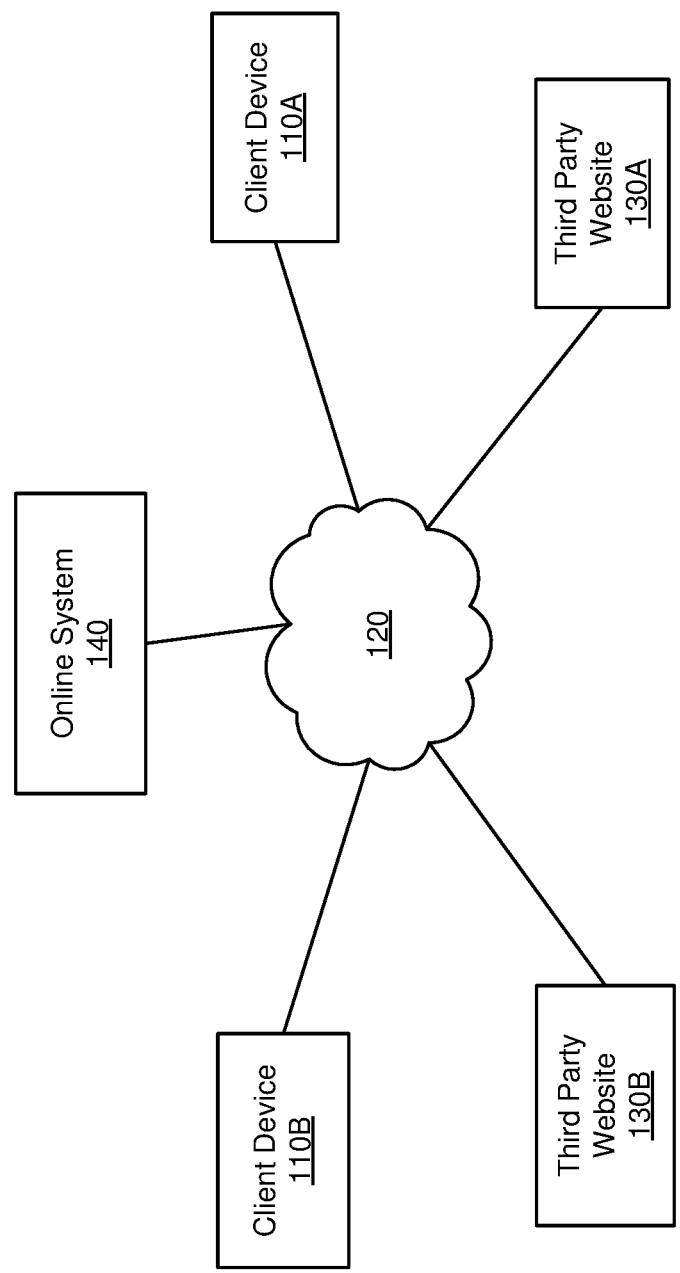
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises client devices 110, a network 120, third-party systems 130, and the online system 140. In alternative configurations, different and/or additional components may be included in the system environment 100. For example, the online system 140 is a social networking system, a content sharing network, or another system providing content to users. As another example, there can be a different number (such as a significantly larger number) of client devices 110 and/or third-party systems 130 included in the system environment 100.

The client devices 110 are computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. The client devices 110 are configured to prefetch data from the third party websites 130 under prefetch instructions from the online system 140. For example, upon receiving a prefetch instruction to prefetch data from a third party website 130 from the online system 140, a client device 110 prefetches HTML and/or resources of a web page of the third party website 130.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party websites 130 may be coupled to the network 120 for communicating with the online system 140, which is further described below in conjunction with FIG. 2. In one embodiment, a third party website 130 is an application provider communicating information describing applications for execution by a client device 110 or communicating data to client devices 110 for use by an application executing on the client device. In other embodiments, a third party website 130 provides content or other information for presentation via a client device 110. A third party website 130 may also communicate information to the online system 140, such as advertisements, content, or information about an application provided by the third party website 130. The third party websites 130 provide webpages associated with URLs. Also, the third party websites 130 are configured to send prefetch data (e.g., HTML and/or resources of web pages) to the client devices 110 in response to prefetching by the client devices 110.

Figure 2:
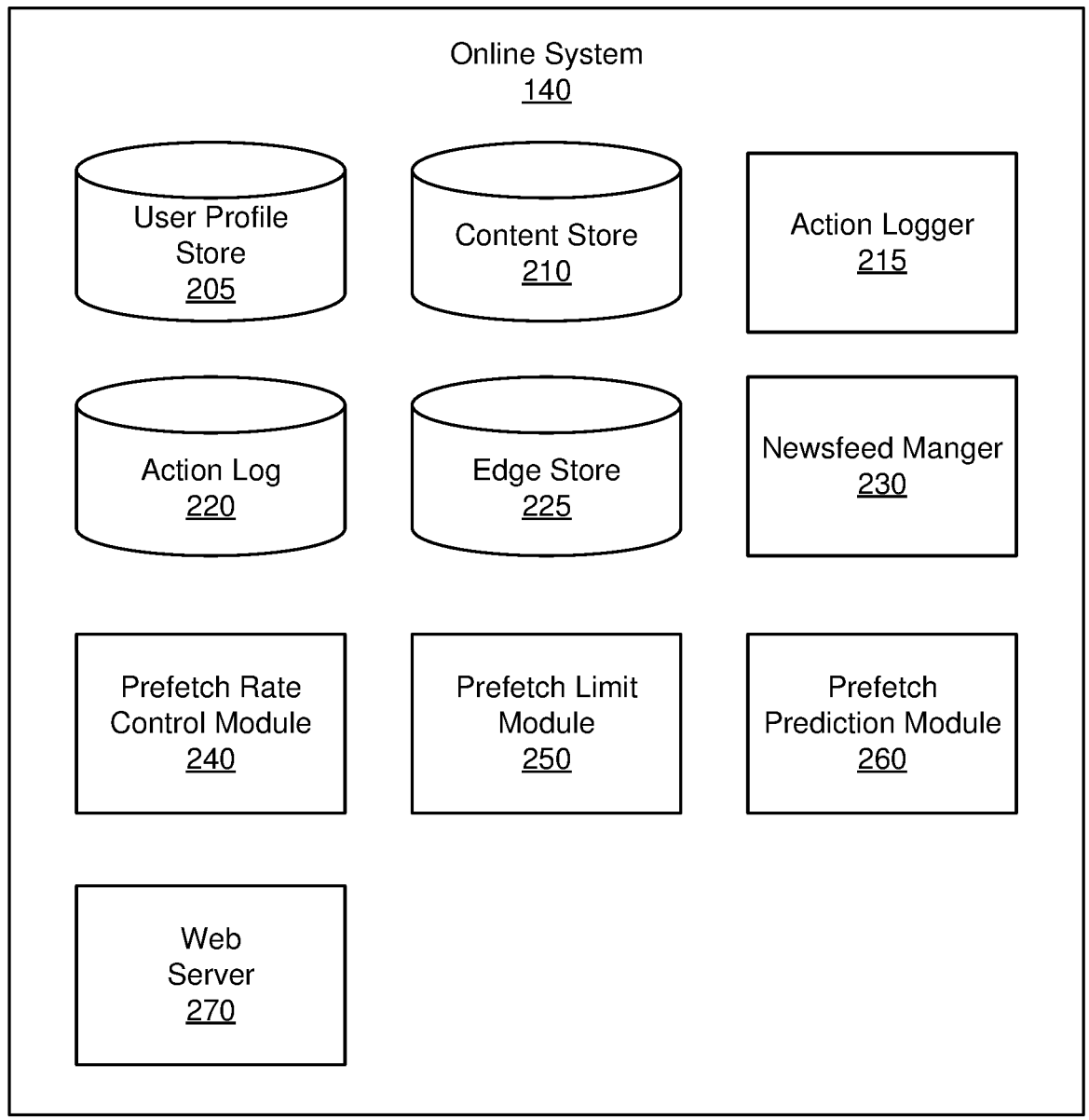
FIG. 2 is a block diagram of the online system, in accordance with an embodiment.

FIG. 2 is a block diagram of the online system 140, in accordance with an embodiment. The online system 140 shown in FIG. 2 includes a user profile store 205, a content store 210, an action logger 215, an action log 220, an edge store 225, a newsfeed manager 230, a prefetch feedback module 240, a prefetch limit module 250, a prefetch prediction module 260, and a web server 270. In other embodiments, the online system 140 may include additional, fewer, or different components for various applications. Conventional components such as network interfaces, security functions, load balancers, failover servers, management, and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like.

A user profile may store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects. Each of the objects represents various types of content. Examples of content represented by an object include a page post, a status update, a photograph, a video, an audio, a link, a shared content item, a gaming application achievement, a check-in event at a local business, a brand page, or any other type of content. Content stored in the content store 310, regardless of its composition, may be referred to herein as one or more "content items," or as "content."

Online system users may create objects stored by the content store 210, such as status updates, photos tagged by users to be associated with other objects in the online system 140, events, groups or applications. In some embodiments, objects are received from third-party applications or third-party websites 130 separate from the online system 140. For example, an object includes a URL of a third party website 130. The URL is associated with a web page of the third party website 130. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140. Content items can be presented, e.g., through newsfeed, to an online system user and other online system uses that are connected to the online system user.

The action logger 215 receives communications about user actions internal to and/or external to the online system 140, populating the action log 220 with information about user actions. Examples of actions include adding a connection to another user, sending a message to another user, uploading an image, reading a message from another user, playing content associated with another user, and attending an event posted by another user. In addition, a number of actions may involve an object and one or more particular users, so these actions are associated with the particular users as well and stored in the action log 220.

Users may interact with various objects on the online system 140, and information describing these interactions is stored in the action log 220. Examples of interactions with objects include: expressing preference or disfavor of posts, commenting on posts, hiding posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. A user may perform different actions on different types of content items. For example, for videos, actions that a user may perform include playing the video, commenting on the video, liking the video, sharing the video, hiding the video, leaving the video, deleting the video, etc. In some embodiments, data from the action log 220 is used to infer interests or preferences of a user, augmenting the interests included in the user's user profile and allowing a more complete understanding of user preferences.

The action log 220 may also store user actions taken on third party websites 130, such as an external website, and communicated to the online system 140. For example, the action log 220 can log information related to actions on third party websites 130, e.g., interaction of users associated with content items provide by third party websites 130 and prefetches performed by client devices 110 from third party websites. As another example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party website 130, including webpage playing histories, advertisements that were interacted, purchases made, and other patterns from shopping and buying. Additionally, actions a user performs via an application associated with a third party website 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, coworkers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the online system 140 identifies stories likely to be of interest to a user through a "newsfeed" presented to the user. A story presented to a user may describe an action taken by another user connected to the user and identifies the additional user. In some embodiments, a story describing an action performed by a user may be accessible to users not connected to the user that performed the action. The newsfeed manager 230 may generate stories for presentation to a user based on information in the action log 220 and in the edge store 225 or may select candidate stories included in the content store 210. One or more of the candidate stories are selected and presented to a user by the newsfeed manager 230.

For example, the newsfeed manager 230 receives a request to present one or more stories to an online system user. The newsfeed manager 230 accesses one or more of the user profile store 205, the content store 210, the action log 220, and the edge store 225 to retrieve information about the identified user. For example, stories or other data associated with users connected to the identified user are retrieved. The retrieved stories or other data are analyzed by the newsfeed manager 230 to identify candidate content items, which include content having at least a threshold likelihood of being relevant to the user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user.

In various embodiments, the newsfeed manager 230 provides stories for display to a user through a newsfeed including a plurality of stories selected for presentation to the user. The newsfeed may include a limited number of stories or may include a complete set of candidate stories. The number of stories included in a newsfeed may be determined in part by a user preference included in user profile store 205. The newsfeed manager 230 may also determine the order in which selected stories are presented via the newsfeed. For example, the newsfeed manager 230 determines that a user has a highest affinity for a specific user and increases the number of stories in the newsfeed associated with the specific user or modifies the positions in the newsfeed where stories associated with the specific user are presented.

The newsfeed manager 230 may also account for actions by a user indicating a preference for types of stories and selects stories having the same, or similar, types for inclusion in the newsfeed. Additionally, the newsfeed manager 230 may analyze stories received by the online system 140 from various users to obtain information about user preferences or actions from the analyzed stories. This information may be used to refine subsequent selection of stories for newsfeed stories presented to various users.

The prefetch feedback module 240 instructs a client device 110 associated with a target user whether to prefetch data from a particular third party website based on feedbacks from the particular third party website. The prefetch feedback module 240 receives tracking requests sent by client devices 110 associated with users of the online system. A client device 110 sends a tracking request to the online system informing the online system of prefetch requests sent by the client device to the particular third party website 130 and/or receiving a data from the particular third party website in response to the prefetch request. The data may comprise a markup language document of a web page or resources associated with a web page. The tracking request describes the prefetch response. The prefetching response may include a hypertext transfer protocol (HTTP) response code indicating whether the client device 110 successfully prefetched from the particular third party website. The prefetch feedback module 240 determines an error rate of the particular third party website based on the received tracking requests. For example, the prefetch feedback module 240 determines a percentage of prefetch responses from the particular third party website that comprise an HTTP response code other than a response code indicating successful prefetch.

The prefetch feedback module 240 adjusts an aggregate prefetch rate associated with the particular third party website based on the error rate. For example, if the prefetch feedback module 240 determines that the error rate of the third party website exceeds a threshold value, the prefetch feedback module 240 decreases the aggregate prefetch rate associated with the third party. In some embodiments, after determining that the error rate of the third party website is below the threshold value, the prefetch feedback module 240 increases the aggregate prefetch rate. The prefetch feedback module 240 then determines whether the adjusted aggregate prefetch rate has been reached within the time interval before the request from the target user was received. In response to the adjusted aggregate prefetch rate being reached, the prefetch feedback module 240 may generate a prefetch instruction not to prefetch data from the particular third party website. Otherwise, the prefetch feedback module 240 generates a prefetch instruction to continue to prefetch data from the particular third party website. The prefetch instruction is sent to the client device 110 associated with the target user.

The prefetch limit module 250 provides a prefetch instruction associated with a third party website to a target user based on a determination of whether a prefetch count for the third party website within a time interval exceeds a prefetch quota of the third party website. Examples time interval include one hour time interval, 6 hour long time interval, or time intervals of different lengths. In some embodiment, the prefetch limit module 250 receives the prefetch quota from a privileged user of the online system 140. Alternatively, the prefetch limit module 250 determines the prefetch quota based on historical data. For example, the prefetch limit module 250 arbitrarily sets a prefetch quota amount and the monitors the performance of the third party website. The prefetch limit module 250 may monitor the performance of the third party website by monitoring error responses received by client devices from the third party website. The prefetch limit module 250 adjusts the prefetch quota based on the performance of the third party website. For example, if the prefetch limit module 250 determines that the performance of the third party website deteriorates responsive to setting the prefetch quota, the prefetch limit module 250 reduces the prefetch quota amount. The prefetch limit module 250 can continue to monitor the performance of the third party website and determine whether to further adjust the prefetch quota.

The prefetch limit module 250 also determines a value of a prefetch count for the third party website based on prefetch information received from one or more client devices. The prefetch information describes prefetches by the one or more client devices from the third party website during the time interval. The value of the prefetch count indicates an aggregated number of prefetches performed by client devices from the third party website during the time interval. In some embodiments, the prefetch limit module 250 determines the value of the prefetch count in a moving time window manner. For example, the prefetch limit module 250 determines the value of the prefetch count during the time interval before the online system received the request from the client device associated with the target user. After the prefetch limit module 250 receives an additional request for content items comprising URL of the third party website, the prefetch limit module 250 determines an additional value of the prefetch count during the time interval before the online system received the additional request.

Based on the prefetch quota and the value of the prefetch count, the prefetch limit module 250 can instruct the client device whether to prefetch data from the third party website for not. The prefetch limit module 250 compares the value of the prefetch count of the third party website with the prefetch quota of the third party website. If the prefetch limit module 250 determines that the value of the prefetch count exceeds the prefetch quota, the prefetch limit module 250 generates a prefetch instruction stop prefetching data from the third party website. In contrast, after the prefetch limit module 250 determines that the value of the prefetch count does not exceed the prefetch quota, the prefetch limit module 250 generates a prefetch instruction to prefetch data from the third party website. Since the prefetch limit module 250 maintains a moving time window, even if the prefetch count exceeds the prefetch quota at a particular point in time, as the time window moves, the prefetch count automatically decreases as older prefetches are not considered in the prefetch count after they are excluded from the time window. The prefetch limit module 250 sends the prefetch instruction to the client device associated with the target user. In one embodiment, the prefetch instruction is sent along with the identified content item.

In some embodiments, the prefetch limit module 250 can adjust the prefetch quota. For example, the prefetch limit module 250 can determine multiple values of the prefetch count during a predetermined period of time (e.g., one day). The prefetch limit module 250 compares the values of the prefetch count to the prefetch quota. After determining that the values of the prefetch count exceeds the prefetch quota for more than a threshold number of times during the predetermined period of time, the prefetch limit module 250 increases the prefetch quota by a predetermined ratio.

In some embodiments, the prefetch limit module 250 generates a prefetch instruction further based on an efficiency cap. The efficiency cap is determined based on a number of logged interactions of users associated with the third party website. After determining that the efficiency cap has been reached with a predetermined period of time, the prefetch limit module 250 generates a prefetch instruction to stop prefetching data from the third party website.

The prefetch prediction module 260 provides a prefetch instruction of a third party website 130 to a target user based on a prediction of whether the target user would access the third party website. To generate the prefetch instruction, the prefetch prediction module 260 determines a first measure of likelihood and a second measure of likelihood. The first measure of likelihood indicates a likelihood that the target user would perform a user interaction associated with the content item in general or with the particular third party website via the URL in the content item. For example, the first measure of likelihood indicates a likelihood of the target user accessing the particular third party website by clicking on URL in the content item. The second measure of likelihood indicates a likelihood that the target user would perform less than a threshold amount of activities with the particular third party website after accessing the website, e.g., a likelihood of the target user bouncing from the particular third party website. A user bounces from a third party website if the user sends a request via the client device to access the third party website via the URL, however, responsive to a delay in receiving a response from the third party website, the user start performing some other activity via the client device, for example, scrolling down to other content items received from the online system. The request to the third party may get cancelled by the client device as a result of the user engaging in another activity. Alternatively, a response may arrive late from the third party website but the user ignores the response since the user is now engaged in a different interaction with the client device.

The two measures of likelihood are determined based on information received from a client device 110 associated with the target user. For example, the prefetch prediction module 260 receives, from the client device 110, information describing past interactions of the target user with the particular third party website and information describing one or more characteristics of the client device. The past interactions of the target user can include historical interactions with content items provided by the particular third party website 130 or historical activities conducted by the user on the particular third party website 130. In some embodiments, the past interactions of the target user can include historical interactions with content items provided by third party websites that are similar or otherwise related to the particular third party website 130. The characteristics of the client device associated with the target user are selected from a list including: network connectivity of the client device, processing capability of the client device, amount of available resources of the client device, or other characteristics of the client device, or any combination thereof.

In some embodiments, the prefetch prediction module 260 determines the two measures of likelihood by using machine learning based models, each machine learning model trained for determining one of the measures of likelihood. The prefetch prediction module 260 inputs a first set of features including the past interactions into a first machine learning based model configured to predict the first measure of likelihood. The prefetch prediction module 260 inputs a second set of features including the characteristics of the client device into a second machine learning based model configured to predict the second measure of likelihood. In some embodiments, the first and second trained models are parts of a single trained model.

The prefetch prediction module 260 generates a prefetch instruction based on the first and second measures of likelihood. In some embodiments, the prefetch prediction module 260 generates a prefetch instruction to prefetch data from the particular third party website, after determining that the first measure of likelihood exceeds a first threshold value or that the second measure of likelihood exceeds a second threshold value. The prefetch prediction module 260 can further send the prefetch instruction to the client device 110. The first and second threshold values may be specified by an expert user or determined via trial and error, for example, by trying various threshold values and selecting the ones that provide expected results. The prefetch instruction may be sent together with the content item.

The web server 270 links the online system 140 via the network 120 to the one or more client devices 110, as well as to the one or more third party websites 130. The web server 270 serves web pages, as well as other content, such as JAVA®, FLASH®, XML and so forth. The web server 270 may provide application programming interface (API) functionality to send data directly to native client device operating systems, such as IOS®, ANDROID™, or BlackberryOS. For example, the webserver 270 can provide prefetch instructions generated by the prefetch feedback module 240, the prefetching limit module 250, or the prefetch prediction module 260 to online system users. The webserver 270 can also provide content items in newsfeeds generated by the newsfeed manager 230 to online system users. Additionally, the web server 270 may receive and route messages between the online system 140 and the client device 110, for example, instant messages, queued messages (e.g., email), text messages, short message service (SMS) messages, or messages sent using any other suitable messaging technique.

Prefetch Feedback

Figure 3:
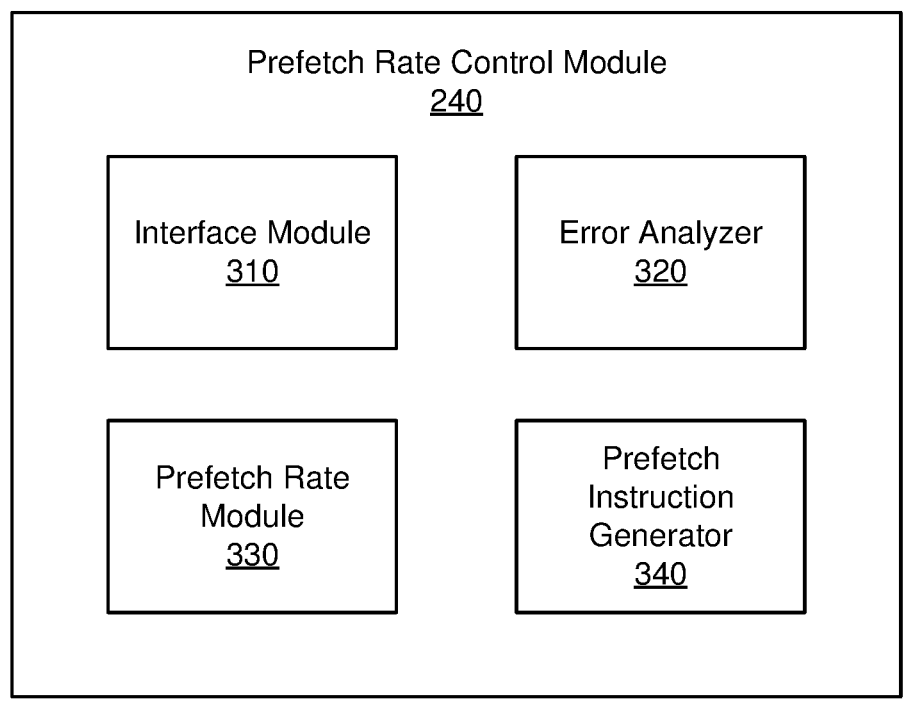
FIG. 3 is a block diagram of a prefetch feedback module of the online system, in accordance with an embodiment.

FIG. 3 is a block diagram of a prefetch feedback module 240 of the online system 140, in accordance with an embodiment. The prefetch feedback module 240 includes an interface module 310, an error analyzer 320, a prefetch rate module 330, and a prefetch instruction generator 340. In other embodiments, the prefetch feedback module 240 may include additional, fewer, or different components for various applications.

The interface module 310 facilities communication of the prefetch feedback module 240 with other entities. The interface module 310 receives tracking requests from client devices. A tracking request is sent by a client device in response to one or more of, the client device sending a request for prefetching data from the particular third party website or receiving a prefetching response from the particular third party website. In an embodiment, the tracking requests describe one or more prefetch responses received from the third party website. The prefetching response may include a hypertext transfer protocol (HTTP) response code indicating whether the client device successfully prefetched data from the particular third party website. In some embodiments, a HTTP response other than 200 OK indicates a successful prefetch.

The interface module 310 sends the received tracking requests to the error analyzer 320 for processing. The tracking requests may be received through the web server 270. For example, after the web server 270 receives the tracking requests from the client device, the web server 270 sends the tracking requests to the interface module 510. In addition to receiving requests and prefetch information, the interface module 510 sends a prefetch instruction generated by the prefetch instruction generator 340 to the client device 110 associated with the target user request for content. In some embodiments, the prefetch instruction is sent to the target user through the web server 270 along with the content item identified for the target user by the newsfeed manager 230.

The error analyzer 320 determines an error rate of the particular third party website. For example, the error analyzer 320 determines a percentage of prefetch responses from the particular third party website that comprise an HTTP response code other than a response code indicating successful prefetches. Accordingly, the error rate indicates a percentage of successful prefetches out of all prefetches performed by a plurality of client devices accessing the third party website, prefetch responses of which are received by the prefetch feedback module 240. In other embodiments, the prefetch response from the particular party website may include other formats of responses than HTTP code.

The prefetch rate module 330 adjusts prefetch rate of client devices based on the determined error rate. In an embodiment, the prefetch rate module 330 adjusts an aggregated prefetch rate based on the determined error rate. The aggregate prefetch rate indicates a limit on prefetches that can occur during a unit time interval. The time interval can be one hour, one day, or a different duration of time. To adjust the aggregated prefetch rate, the prefetch rate module 330 compares the error rate with a threshold value. Example threshold values are 16%, 20%, 25% or other values. After determining that the error rate of the particular third party website exceeds the threshold value, the prefetch rate module 330 decreases the aggregate prefetch rate associated with the third party, e.g., to a predetermined lower value. Alternatively, if the prefetch rate module 330 determines that the error rate of the particular third party website is below the threshold value, the prefetch rate module 330 increases the aggregate prefetch rate associated with the third party, e.g., to a predetermined higher value. For example, the predetermined lower value can be half of the predetermined higher value. In some embodiments, the decrease in the aggregate prefetch rate depends on the amount by which the error rate exceeds the threshold value. For example, in instances where the error rate exceeds the threshold value by 50%, the aggregate prefetch rate may be decreased by 40%, while in instances where the error rate exceeds the threshold value by 20%, the aggregate prefetch rate is decreased by 15%.

The prefetch instruction generator 340 generates a prefetch instruction based on the adjusted aggregate prefetch rate. The prefetch instruction may be provided as a markup language tag in a web page comprising content items sent by the online system to the client device. The prefetch instruction generator 340 determines whether the adjusted aggregate prefetch rate has been reached within the unit time interval since the request for content was received from the target user. In some embodiments, the prefetch instruction generator 340 determines a count of prefetches within the unit time interval since the request for content was received and compares the count with the aggregate prefetch rate. The aggregate prefetch rate is determined to have been reached if the count is the same as or larger than the aggregate prefetch rate. Otherwise, the prefetch instruction generator 340 determines that the aggregate prefetch rate has not been reached. The prefetch instruction generator 340 generates the prefetch instruction based on the comparison. For example, the prefetch instruction generator 340 determines that the adjusted aggregate prefetch rate of the third party website has been reached within a the time interval before the request for content from the target user was received and generates a prefetch instruction indicating to the client device to stop prefetching data from the particular third party website. As another example, the prefetch instruction generator 340 determines that the adjusted aggregate prefetch rate of the third party website has not been reached within a the time interval before the request for content from the target user was received and generates a prefetch instruction to prefetch data or to increase a rate of prefetching data from the particular third party website.

Figure 4:
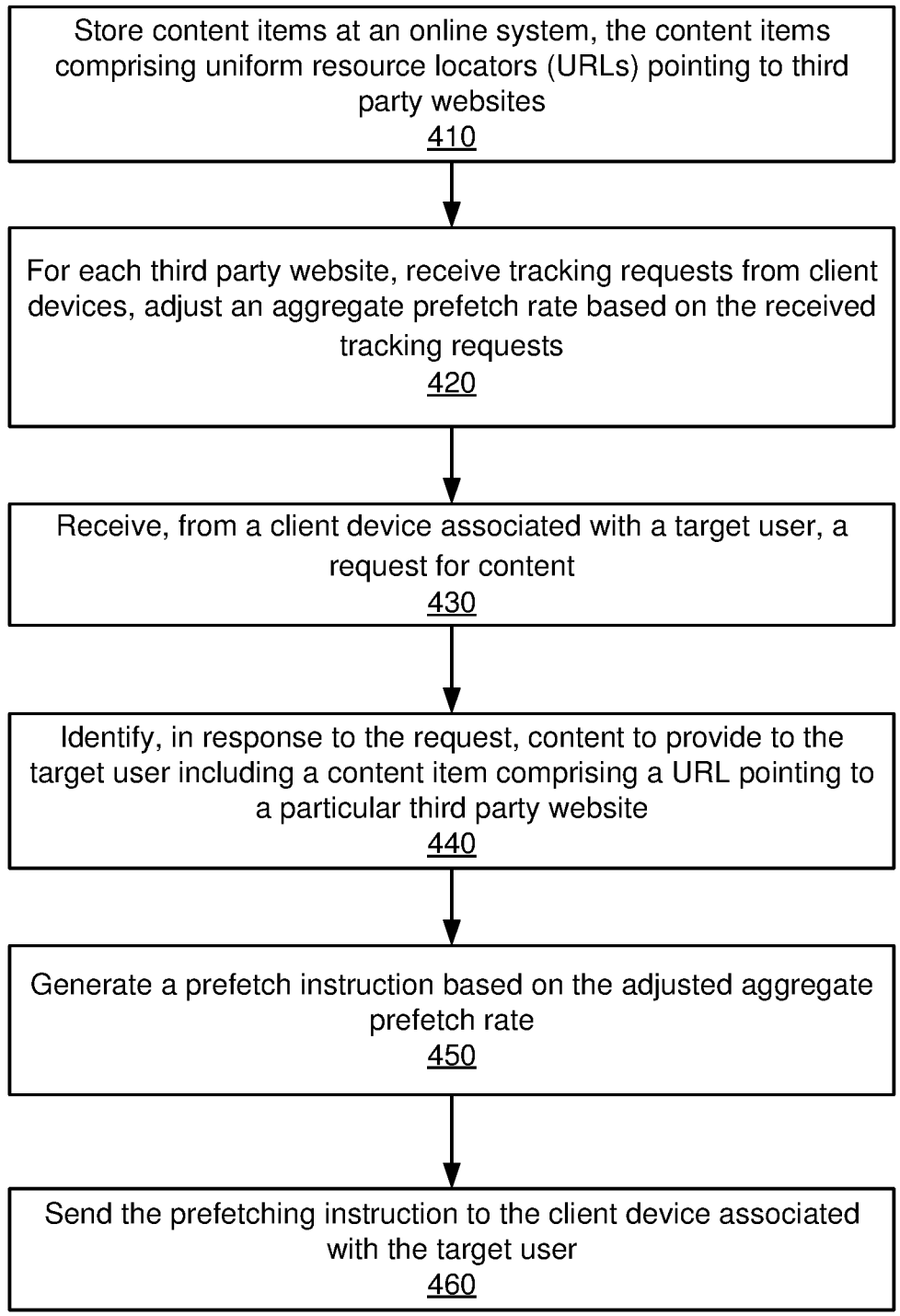
FIG. 4 is a flowchart illustrating a process for generating a prefetch instruction associated with a third party website based on an aggregated prefetch rate of the third party website, in accordance with an embodiment.

FIG. 4 is a flow chart illustrating a process for generating a prefetch instruction associated with a third party website based on an aggregated prefetch rate of the third party website, in accordance with an embodiment. In some embodiments, the process is performed by the prefetch feedback module 240 of the online system 140, although some or all of the operations in the method may be performed by other entities in other embodiments. In some embodiments, the operations in the flow chart are performed in a different order and can include different and/or additional steps.

The online system 140 stores 410, e.g., at the content store 210, content items. The content items include URLs pointing to third party websites. For each of the plurality of third party websites, the online system 140 receives 420 tracking requests from client devices. The online system 140 further adjusts 420 an aggregated prefetch rate based on the received tracking requests. For example, the prefetch feedback module 240 of the online system 140, determines an error rate describing responses of the third party website based on the tracking requests. The prefetch feedback module 240 uses the error rate as a measure of performance of the third party website. For example, the prefetch feedback module 240 may determine that a high error rate indicates that the third party website is performing poorly as a result of increase in work load caused by excessive requests received from client devices by the third party website. Alternatively, the prefetch feedback module 240 may determine that a high error rate may indicate that the third party website has crashed. In response to determining that the error rate is higher than a threshold rate, the online system 140, e.g., the prefetch feedback module 240, decreases the aggregated prefetch rate for that particular third party website. In response to determining that the error rate is lower than a threshold rate, the online system 140, e.g., the prefetch feedback module 240, increases the aggregated prefetch rate for that particular third party website.

The online system 140 further receives 430 a request for content from a client device associated with a target user. In response to the request, the online system 140, e.g., the newsfeed manager 230, identifies 440 content to provide to the target user. The content includes a content item comprising a URL pointing to a particular third party website. The online system 140, e.g., the prefetch feedback module 240, generates 450 a prefetch instruction based on the aggregated prefetch rate. For example, the online system 140 determines whether the aggregate prefetch rate has reached a threshold value during a unit time interval since the request was received. Responsive to that the aggregate prefetch rate has reached the threshold value, the online system 140 generates a prefetch instruction to stop prefetching data from the particular third party website. Otherwise, the online system 140 generates a prefetch instruction to prefetch data from the particular third party website, for example, either start prefetching if the prefetching was stopped, continue prefetching if the prefetching was not stopped previously, or prefetch data at a different rate. The online system 140 further sends 460 the prefetch instruction to the client device associated with the target user. In some embodiments, the prefetch instruction is sent to the client device along with the identified content item.

Enforcing Prefetch Limit Across Client Devices for a Third Party Website

Figure 5:
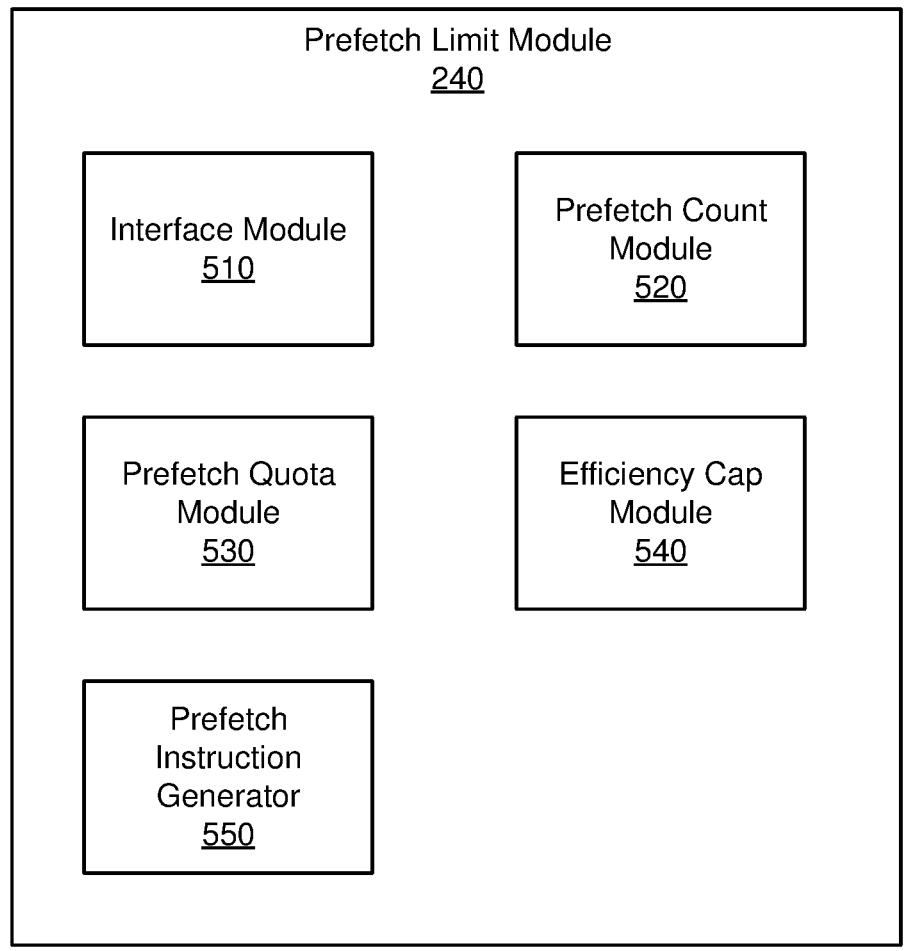
FIG. 5 is a block diagram of a prefetch limit module of the online system, in accordance with an embodiment.

FIG. 5 is a block diagram of a prefetch limit module 250 of the online system 140, in accordance with an embodiment. The prefetch limit module 250 includes an interface module 510, a prefetch count module 520, a prefetch quota module 530, an efficiency cap module 540, and a prefetch instruction generator 550. In other embodiments, the prefetch limit module 250 may include additional, fewer, or different components for various applications.

The interface module 510 facilitates communication of the prefetch limit module 250 with other entities. In some embodiments, the interface module 510 is combined with the interface module 310 of the prefetch feedback module 240. The interface module receives prefetch information from client devices 110. The prefetch information describes prefetches performed by client devices 110. The client devices 110 may be different from the client device 110 associated with the target user. In some embodiments, the prefetch information from a client device 110 includes a time stamp indicating a time when the client device 110 performed the prefetch and identification information (e.g., URL) of a third party website 130 from which data was prefetched.

The online system may receive the request comprising the prefetch information through the web server 270. For example, after the web server 270 receives the request and prefetch information from the client device 110, the web server 270 sends the request and prefetch information to the interface module 510. In addition to receiving requests and prefetch information, the interface module 510 sends prefetch instructions generated by the prefetch instruction generator 550 to the client device 110 associated with the target user, e.g., along with a content item identified in response to the request of the target user.

The prefetch count module 520 determines a value of a prefetch count for a third party website 130 during a time interval. The value of the prefetch count indicates an aggregated number of prefetches performed by client devices 110 from the third party website 130 during the time interval. The determination of the value is based on prefetch information that describes prefetches from the third party website during the time interval. For example, the prefetch count module 520 retrieves prefetch information that includes identification information associated with the third party website 130 and includes time stamps that fall in the time interval to determine the aggregated number of prefetches. In an embodiment, the prefetch count module 520 performs some analysis to determine the aggregate number of prefetches associated with the third party website. For example, the prefetch count module 520 receives prefetch requests from a sample subset of all possible client devices associated with the online system that could be prefetching data from the third party website and extrapolates the aggregate number of prefetches from the sampled data.

The time interval, in some embodiments, may be received from a privileged user, for example, a system administrator of the online system 140. In one embodiment, the time interval is a unit time duration counted from a predetermined time. For example, the unit time duration can be one hour and the predetermined time can be 0:00 clock of a day. Accordingly, the time interval can be 0-1 am, 1-2 am, and so on. The unit time duration can be a different time duration than one hour, and the predetermined time can be a different time than 0:00 clock of a day. In another embodiment, the time interval is a moving time window representing a unit time duration before a time when the request is received from the client device 110 associated with the target user. For example, the time interval may be the interval that covers one hour before the request was received. For example, at a given time T, the time interval is T-T0, where T0 is the length of the time interval.

The prefetch quota module 530 determines a prefetch quota for the third party website 130. The prefetch quota module 530 may receive the prefetch quota from a privileged user, for example, a system administrator of the online system 140. The prefetch quota module 530 adjusts the prefetch quota based on a number of times the prefetch count exceeds the prefetch quota within a predetermined period of time. The predetermined period of time can be a day, few hours, two or more days, or a different amount of time. The prefetch quota module 530 receives, from the prefetch count module 520 a plurality of values for the prefetch count for the third party website during the predetermined period of time, each value determined at a different time during the predetermined period of time. The prefetch quota module compares each value of the prefetch count for the third party with the prefetch quota for the particular third party. Based on the comparison, the prefetch quota module 530 determines whether the values of prefetch counts for the particular third party exceeded the prefetch quota during the predetermined period of time for more than a threshold number of times. For example, the prefetch quota module 530 determines out of the received values of the prefetch count, whether more than a threshold number of instances of values of the prefetch count exceeded the prefetch quota.

Responsive to a determination that the values of prefetch counts for the particular third party exceeded the prefetch quota during the predetermined period of time for more than a threshold number of times, the prefetch quota module 530 increases the prefetch quota by a predetermined ratio. The predetermined ratio can be 1.11, 1.2, 1.3, or another value. Responsive to a determination that the values of prefetch counts for the particular third party did not exceed the prefetch quota during the predetermined period of time for more than a threshold number of times, the prefetch quota module 530 may decrease the prefetch quota or not change the prefetch quota.

The efficiency cap module 540 determines an efficiency cap for the third party website. An efficiency cap indicates a limit on prefetches from the third party website during a predetermined period of time (e.g., 12 hours) based on interactions of users (e.g., click) with content items provided by the third party website during the time interval. For example, in instances where the third party website 130 manages to receive a number of clicks, the third party website 130 can manage to receive a larger number prefetches, e.g., four times the number of the clicks. In some embodiments, the efficiency cap module 540 retrieves interactions of users of the online system with one or more content items provided by the particular third party website and determines a number of the interactions associated with the content items provided by the particular third party website. Further, the efficiency cap module 540 determines an efficiency cap based on the determined number of the interactions. For example, the efficiency cap equals the determined number of the interaction times a predetermined number.

The predetermined number is a value larger than one and can be determined based on characteristics of the third party website and/or a type of the interactions. Characteristics of the third party website include a number of content items provided by the third party website, types of content items provided by the third party website (text, images, audio, video, etc.), computing power of a server associated with the third party website, other types of characteristics, or any combination thereof. The type of the interactions can be click, input, response, other types of interaction, or any combination thereof. In an embodiment, the online system receives these details from a system administrator or by communicating with a server of the third party website.

The prefetch instruction generator 550 generates a prefetch instruction based on outputs from the prefetch count module 520, the prefetch quota module 530, and the efficiency cap module 540. The prefetch instruction generator 550 generates a prefetch instruction based on the value of the prefetch count and the prefetch quota. For example, the prefetch instruction generator 550 determines whether the value of the prefetch count for the particular third party website exceeds the prefetch quota for the particular third party, i.e., whether the prefetch quota has been reach during the time interval. In response to a determination that the prefetch quota has been reach, the prefetch instruction generator 550 generates an instruction to not prefetch data from the particular third party website. In response to a determination that the prefetch quota has not been reach, the prefetch instruction generator 550 generates an instruction to prefetch data from the particular third party website.

The prefetch instruction generator 550 generates the prefetch instruction further based on the efficiency cap determined by the efficiency cap module 540. The prefetch instruction generator 550 determines whether the determined efficiency cap has been reached within a time interval before the prefetch request is received. In some embodiments, the prefetch instruction generator 550 generates a prefetch instruction not to prefetch data from the particular third party website in the prefetch request after determining that the determined efficiency cap has been reached, even though the prefetch quota has not been reached. The prefetch instruction generator 550 generates a prefetch instruction to prefetch data from the third party web site after determination that the prefetch quota has not been reached and that the determined efficiency cap has not been reached. In some other embodiments, the prefetch instruction generator 550 gives higher priority to the prefetch quota, meaning the prefetch instruction generator 550 generates an instruction to prefetch data from the particular third party website after determining that the prefetch quota has not been reached, despite a determination that the efficiency cap has been reached.

Figure 6:
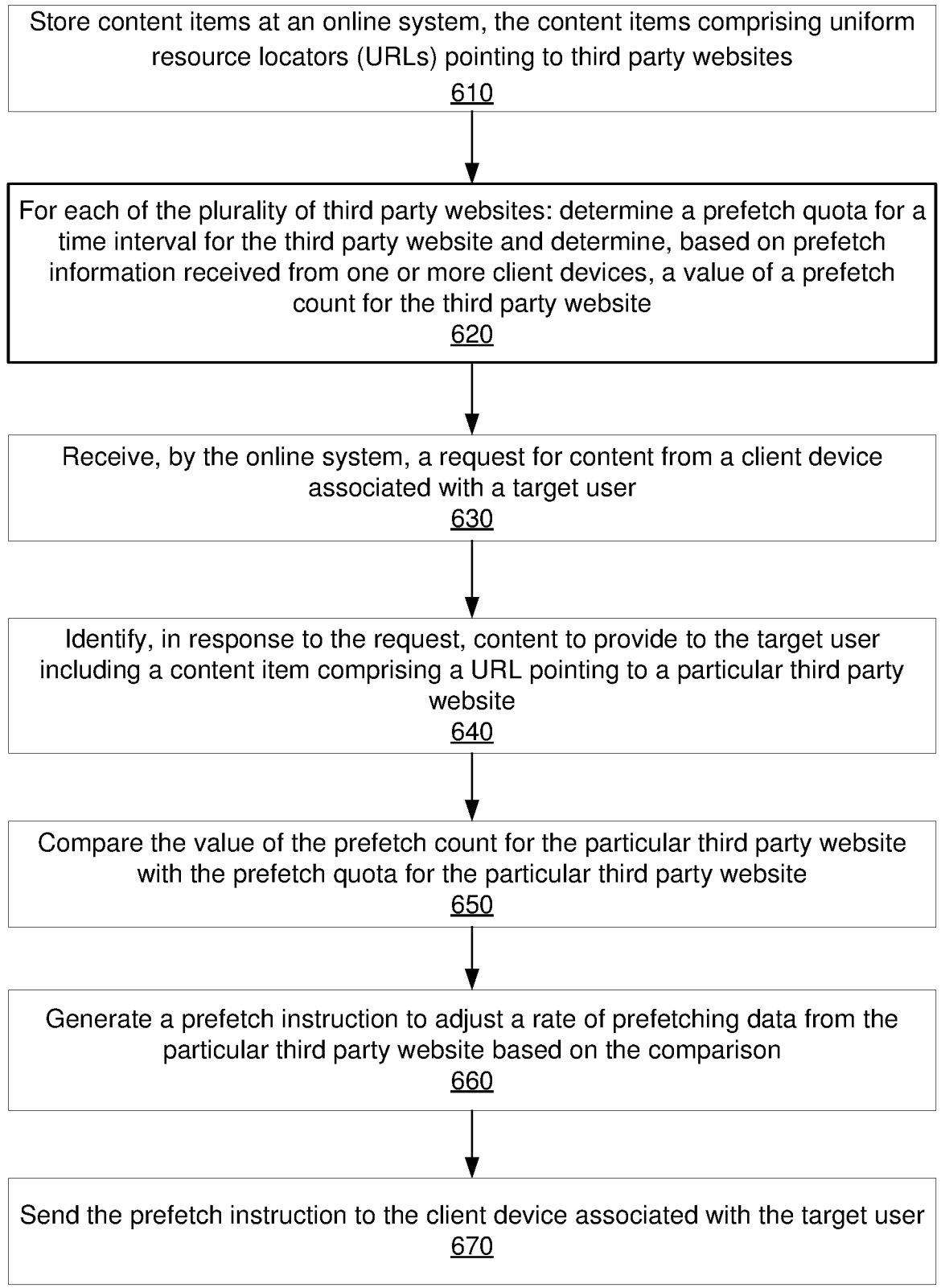
FIG. 6 is a flowchart illustrating a process for generating a prefetch instruction associated with a third party website based on a prefetch count and a prefetch quota of the third party website, in accordance with an embodiment.

FIG. 6 is a flowchart illustrating a process for generating a prefetch instruction associated with a third party website based on a prefetch count and a prefetch quota of the third party website, in accordance with an embodiment. In some embodiments, the process is performed by the online system 140, including the prefetch limit module 250 of the online system 140, although some or all of the operations in the method may be performed by other entities in other embodiments. In some embodiments, the operations in the flow chart are performed in a different order and can include different and/or additional steps.

The online system 140 stores 610 content items, e.g., at the content store 210. The content items comprise URLs pointing to third party websites. For each of the plurality of third party web sites, the online system 140 determines 620 a prefetch quota for a time interval for the third party website and determines 620, based on prefetch information received from one or more client devices, a value of a prefetch count for the third party website. The prefetch information describes prefetches by the one or more client devices from the third party website during the time interval. The value of the prefetch count indicates an aggregated number of prefetches performed by client devices from the third party website during the time interval.

The online system 140 receives 630, e.g., through the web server 270, a request for content from a client device associated with a target user. In response to the request, the online system 140 identifies 640, e.g., by the newsfeed manager 230, content to provide to the target user including a content item comprising a URL pointing to a particular third party website. In order to determine whether to instruct the client device of the target user to prefetch data from the particular third party system, the online system 140, e.g., the prefetch limit module 250, compares 650 the value of the prefetch count for the particular third party website with the prefetch quota for the particular third party website. The online system 140, e.g., the prefetch limit module 250, generates 660 a prefetch instruction to adjust a rate of prefetching data from the particular third party website based on the comparison. For example, in embodiments where that the value of the prefetch count for the particular third party website exceeds the prefetch quota, the prefetch limit module 250 determine to stop prefetching for the time interval from the particular third party. In contrast, in embodiments where the value of the prefetch count for the particular third party website does not exceed the prefetch quota, the prefetch limit module 250 determine to continue prefetching for the time interval from the particular third party. The online system 140 sends 670 the prefetch instruction to the client device 110 associated with the target user. Data prefetches from the particular third party website can be HTML and/or resources of a web page of the particular third party website. In some embodiments, the online system 140 sends the prefetch instruction along with the identified content item to the client device 110.

Prefetch Prediction

Figure 7:
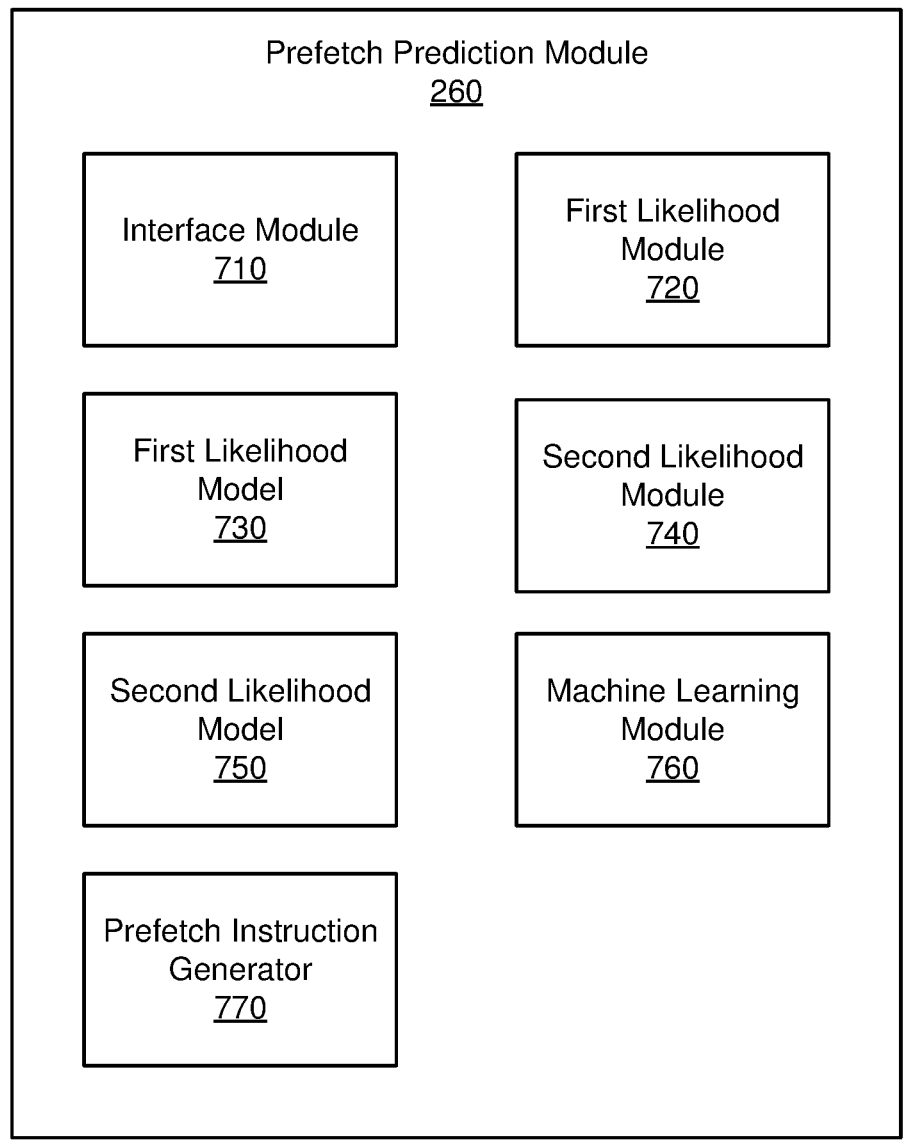
FIG. 7 is a block diagram of a prefetch prediction module of the online system, in accordance with an embodiment.

FIG. 7 is a block diagram of a prefetch prediction module 260 of the online system 140, in accordance with an embodiment. The prefetch prediction module 260 includes an interface module 710, a first likelihood module 720, a first likelihood model 730, a second likelihood module 740, a second likelihood model 750, and a prefetch instruction generator 760. In other embodiments, the prefetch limit module 260 may include additional, fewer, or different components for various applications.

The interface module 710 facilities communication of the prefetch prediction module 260 with other entities, such as client devices 110. In some embodiments, the interface module 710 is combined with the interface module 310 of the prefetch feedback module 240 and/or the interface module 510 of the prefetch limit module 250. The interface module receives information describing one or more past interactions of a target user with a particular third party website 130. The particular third party website 130 provides a content item for providing to the target user. The one or more past interactions are selected from a list including historical interactions with content items provided by the particular third party website 130 (e.g., accessing the particular third party website by clicking on a URL in a content item, liking, sharing, commenting, etc.), historical activities conducted on the particular third party website 130 (e.g., scrolling, inputting, downloading, uploading, etc.), other types of interactions with the particular third party website 130, or any combination thereof.

The interface module 710 also receives information describing one or more characteristics of the client device 110 associated with the target user. The prefetch information describes prefetches performed by client devices 110. The one or more characteristics of the client device associated with the target user are selected from a list including network connectivity of the client device 110, processing capability of the client device 110, other types of characteristics of the client device 110, or any combination thereof. The information may be received through the web server 270. For example, after the web server 270 receives the information from the client device 110, the web server 270 sends the information to the interface module 510. In addition to receiving the information, the interface module 510 sends the prefetch instruction generated by the prefetch instruction generator 550 to the client device 110 associated with the target user, e.g., through the web server 270.

The first likelihood module 720 uses a first likelihood model 730 trained by the machine learning module 760 to determine a first measure of likelihood that the target user would perform an user interaction associated with the content item (e.g., accessing the particular third party website via the URL in the content item). The first likelihood module 720 inputs a first set of features into the first likelihood model 730. The first set of features includes the one or more past interactions of the target user with the particular third party website 130. The first likelihood model 730 outputs a likelihood that the target user would access the particular third party website via the URL in the content item. In one embodiment, the likelihood output from the first likelihood model 730 is a percentage from 0% to 100%, the percentage indicating a probability that the target user will access the particular third party website via the URL in the content item. The output from the first likelihood model 730 can be in other forms indicating a probability that the sampled user would have viewed the video for at least the threshold duration.

The machine learning module 760 applies machine learning techniques to train the first likelihood model 730. As part of the training of the first likelihood model 730, the machine learning module 760 forms a training set of online system users. In some embodiments, the training set includes a positive training set of online system users that have been determined to access third party websites via URLs in content items and a negative training set of online system users that have been determined to not access third party websites via URLs in content items. In one embodiment, the online system users in the training set may be selected based on at least in part on the demographic information or other types of description information of the online system users. The machine learning module 760 extracts features (i.e., the first set of features) from the online system users of the training set, the first set of features being variables deemed potentially relevant to whether or not the online system users have been determined to view videos from third party websites for at least the threshold duration.

Similarly, the second likelihood module 740 uses a second likelihood model 750 trained by the machine learning module 760 to determine a second measure of likelihood that the target user would perform less than a threshold amount of activities on the particular third party website after accessing the website responsive to a slow response from the third party website. For example, the second measure of likelihood indicates that the user will start performing activities different from accessing the third party website, for example, using the client device to access other content items from the online system if the third party website took more than a threshold amount of time to respond to a request from the client device. The threshold amount of activities can be a threshold duration of time spending on the particular third party website 130, a threshold number of scrolling behaviors on the particular third party website 130, a threshold number of downloads from the particular third party website 130, a threshold number of uploads from the particular third party website 130, or any combination thereof. The second likelihood module 740 inputs a second set of features into the second likelihood model 750. The second set of features includes the one or more characteristics of the client device. The second likelihood model 750 outputs a likelihood that the target user would perform less than a threshold amount of activities on the particular third party website after accessing the website. In one embodiment, the likelihood output from the second likelihood model 750 is a percentage indicating probability that the target user would perform less than a threshold amount of activities on the particular third party website after accessing the website. The output from the first likelihood model 730 can be in other forms.

In the embodiment of FIG. 7, the machine learning module 760 trains both the first likelihood model 730 and the second likelihood model 750. In an alternative embodiment, the first likelihood model 730 and the second likelihood model 750 are trained by different machine learning modules. As part of the training of the second likelihood model 750, the machine learning module 760 forms a training set of online system users. In some embodiments, the training set includes a positive training set of online system users that have been determined to perform less than a threshold amount of activities on the particular third party website after accessing the website and a negative training set of online system users that have been determined to perform at least a threshold amount of activities on the particular third party website after accessing the website. In one embodiment, the online system users in the training set may be selected based on at least in part on the demographic information or other types of description information of the online system users. The machine learning module 760 extracts features (i.e., the second set of features) from the online system users of the training set, the second set of features being variables deemed potentially relevant to whether or not the online system users have been determined to perform less than a threshold amount of activities on the particular third party website after accessing the website.

The machine learning module 760 may use different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps in different embodiments. In some embodiments, a validation set is formed of additional online system users, other than those in the training sets, which have already been determined to have or to lack the property in question. The machine learning module 760 applies the trained validation model to the online system users of the validation set to quantify the accuracy of the first likelihood model 730 or the second likelihood model 750. Common metrics applied in accuracy measurement include: Precision=TP/(TP+FP) and Recall=TP/(TP+FN), where precision is how many outcomes the first likelihood model 730 or the second likelihood model 750 correctly predicted (TP or true positives) out of the total it predicted (TP+FP or false positives), and recall is how many outcomes the first likelihood model 730 or the second likelihood model 750 correctly predicted (TP) out of the total number of online system users that did view videos from third party websites for at least the threshold duration (TP+FN or false negatives). The F score (F-score=2*PR/(P+R)) unifies precision and recall into a single measure. In one embodiment, the machine learning module 760 iteratively re-trains the first likelihood model 730 or the second likelihood model 750 until the occurrence of a stopping condition, such as the accuracy measurement indication that the first likelihood model 730 or the second likelihood model 750 is sufficiently accurate, or a number of training rounds having taken place.

The prefetch instruction generator 770 generates a prefetch instruction based on one or more of the first measure of likelihood and second measure of likelihood. In some embodiments, the prefetch instruction generator 770 generates a prefetch instruction based on the second measure of likelihood. In some embodiments, the prefetch instruction generator compares the first measure of likelihood with a first threshold value (e.g., 50%). A determination that the first measure of likelihood is larger than the first threshold value indicates that more likely than not the target user would access the particular third party website via the URL in the content item. Also, the prefetch instruction generator compares the second measure of likelihood with a second threshold value. For example, if the second threshold value is 50%, a determination that the second measure of likelihood is larger than the second threshold value indicates that more likely than not the target user would perform less than a threshold amount of activities on the particular third party website after accessing the website.

The prefetch instruction generator 770 generates a prefetch instruction to prefetch data from the particular third party website 130 upon a determination that the first measure of likelihood is larger than the first threshold value and/or that the second measure of likelihood is larger than the second threshold value. Likewise, the prefetch instruction generator 770 generates a prefetch instruction not to prefetch data from the particular third party website 130 upon a determination that the first measure of likelihood is equal to or less than the first threshold value and/or that the second measure of likelihood is equal to or less than the second threshold value.

Figure 8:
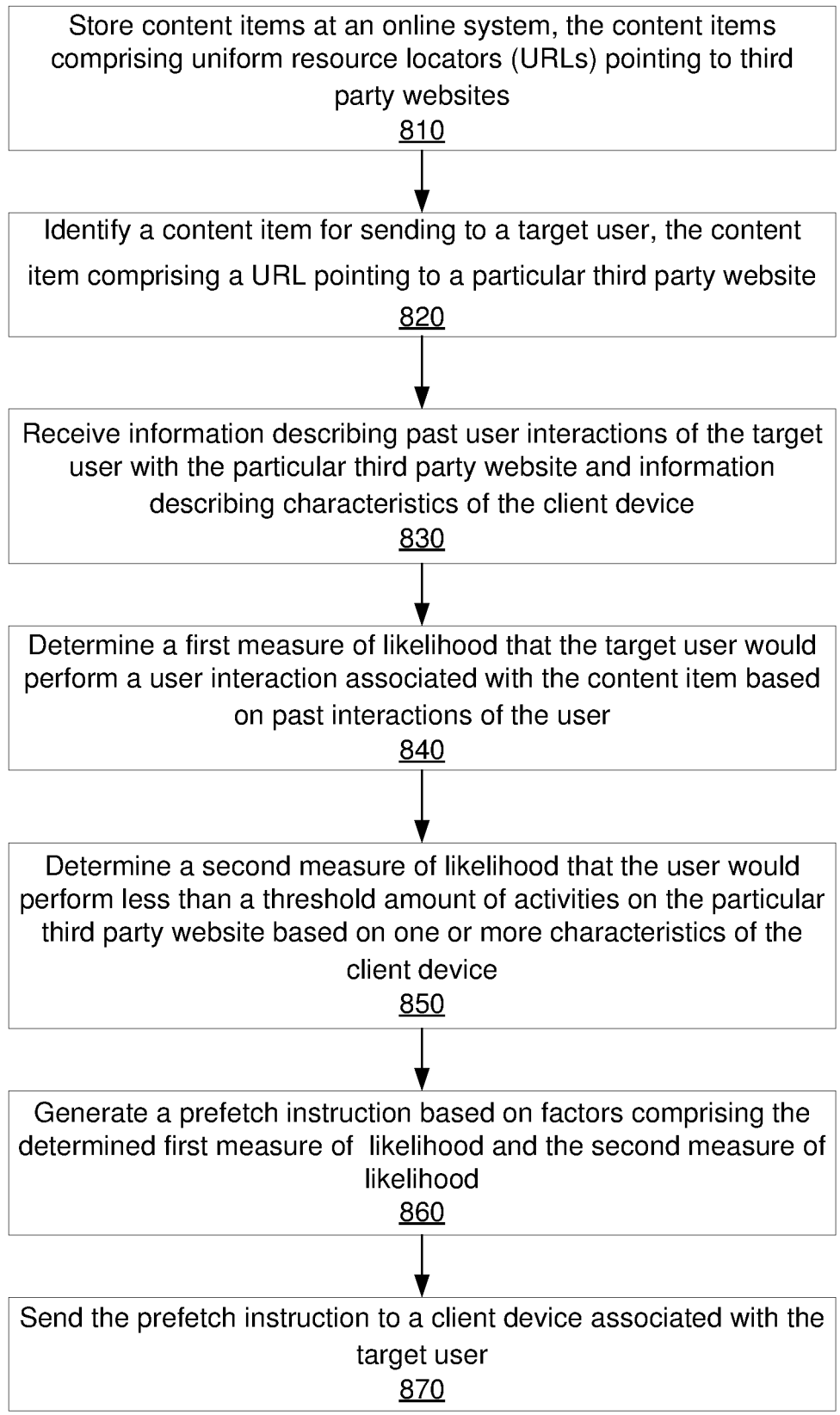
FIG. 8 is a flowchart illustrating a process for generating prefetch instructions for a target user by predicting whether the target user would access a third party website, in accordance with an embodiment.

FIG. 8 is a flowchart illustrating a process for generating prefetch instructions for a target user by predicting whether the target user would access a third party website, in accordance with an embodiment. In some embodiments, the process is performed by the prefetch prediction module 260 of the online system 140, although some or all of the operations in the method may be performed by other entities in other embodiments. In some embodiments, the operations in the flow chart are performed in a different order and can include different and/or additional steps.

The online system 140 stores 810 content items, e.g., at the content store 210. The content items include URLs pointing to third party websites. The online system 140 identifies 820 a content item for sending to a target user. The content item includes a URL pointing to a particular third party website. The identification of the content item can be done by the newsfeed manager 230 of the online system 140. The online system 140 receives 830, from a client device associated with the target user, information describing past user interactions of the target user with the particular third party website and information describing characteristics of the client device. In order to determine whether to instruct the client device to prefetch data from the particular third party website, the online system 140 determines 840 a first measure of likelihood that the target user would perform a user interaction associated with the content item based on the past interactions of the user. The online system 140 determines 850 a second measure of likelihood that the user would perform less than a threshold amount of activities on the particular third party website after accessing the particular third party website 130 based on one or more characteristics of the client device. In some embodiments, the online system 140 inputs the past interactions of the target user with the particular third party website (or the characteristics of the client device) into a model that outputs the first measure of likelihood (or the second measure of likelihood). The model is trained using machine learning techniques.

The online system 140 generates 860 a prefetch instruction based on factors comprising the determined first measure of likelihood and the second measure of likelihood. For example, the online system 140 compares the first measure of likelihood and the second measure of likelihood to a first threshold value and a second threshold value, respectively. Based on either or both of the comparison results, the online system determine whether to instruct the client device to prefetch data from the particular third party website. The online system 140 sends 870 the prefetch instruction to the client device. In some embodiments, the online system 140 sends 870 the prefetch instruction along with the identified content item, e.g., via the web server 270.

Alternative Embodiments

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   storing a plurality of content items at an online system, the plurality of content items comprising uniform resource locators (URLs) of third party websites, each third party website associated with a third party system;
   identifying, by the online system, a content item for sending to a client device associated with a target user, the content item comprising a URL pointing to a particular third party website of the third party websites, the client device configured to prefetch data from the particular third party website before the target user accesses the URL;
   receiving, by the online system, information describing one or more past interactions of the target user with the particular third party website and information describing one or more characteristics of the client device;
   determining, by the online system, a first measure of likelihood that the target user would access the particular third party website via the URL in the content item, the first measure of likelihood determined based on a first set of features comprising the one or more past interactions of the target user with the content item;
   determining, by the online system, a second measure of likelihood that the target user would perform less than a threshold amount of activities on the particular third party website after accessing the particular third party website, the second measure of likelihood determined based on a second set of features comprising the one or more characteristics of the client device;
   generating, by the online system, a prefetch instruction based on factors comprising the determined first measure of likelihood and the second measure of likelihood, the prefetch instruction configured to instruct the client device whether to prefetch data, by the client device from the particular third party website, before the target user accesses the URL; and
   sending, by the online system, the prefetch instruction along with the content item to the client device associated with the target user, the client device configured to prefetch data from the particular third party website before the target user accesses the content item in accordance with the prefetch instruction.

2. The method of claim 1, wherein determining the first measure of likelihood that the target user would access the particular third party website via the URL in the content item comprises:
   inputting the first set of features into one or more machine learning based models, the one or more machine learning based models outputting the first measure of likelihood.

3. The method of claim 1, wherein determining the second measure of likelihood that the user would perform less than the threshold amount of activities on the particular third party website after accessing the particular third party website comprises:
   inputting the second set of features into one or more trained models, the one or more trained models outputting the second measure of likelihood.

4. The method of claim 1, wherein generating the prefetch instruction based on factors comprising the determined first measure of likelihood and the second measure of likelihood comprises:
   comparing the first measure of likelihood with a first threshold value;
   comparing the second measure likelihood with a second threshold value; and
   generating the prefetch instruction for prefetching data from the particular third party website based on the result of the first comparison or the second comparison.

5. The method of claim 1, wherein the past interactions of the target user are selected from a list including: historical interactions with content items provided by the particular third party website, historical activities conducted on the particular third party website, or any combination thereof.

6. The method of claim 5, wherein the historical interactions with content items provided by the particular third party website comprise at least one of the following: accessing the content items provided by the particular third party website, liking the content items provided by the particular third party website, sharing the content items provided by the particular third party website, and commenting the content items provided by the particular third party website.

7. The method of claim 5, wherein the historical activities conducted on the particular third party website comprise at least one of the following: scrolling, inputting, downloading, and uploading.

8. The method of claim 1, wherein the one or more characteristics of the client device associated with the target user are selected from a list including: network connectivity of the client device, processing capability of the client device, or any combination thereof.

9. The method of claim 1, wherein the prefetch instruction is further generated based on factors comprising a value of an item described in the particular third party website.

10. The method of claim 1, wherein the data prefetched from the particular third party website comprises HTML of a web page of the particular third party website, the web page associated with the URL comprised in the content item sent to the client device.

11. The method of claim 1, wherein the data prefetched from the particular third party website comprises resources of a web page of the particular third party website, the web page associated with the URL comprised in the content item sent to the client device.

12. A non-transitory computer readable medium storing executable computer program instructions, the computer program instructions comprising instructions that when executed cause a computer processor to:
   store a plurality of content items at an online system, the plurality of content items comprising uniform resource locators (URLs) of third party websites, each third party website associated with a third party system;
   identify, by the online system, a content item for sending to a client device associated with a target user, the content item comprising a URL pointing to a particular third party website of the third party websites, the client device configured to prefetch data from the particular third party website before the target user accesses the URL;
   receive, by the online system, information describing one or more past interactions of the target user with the particular third party website and information describing one or more characteristics of the client device;
   determine, by the online system, a first measure of likelihood that the target user would access the particular third party website via the URL in the content item, the first measure of likelihood determined based on a first set of features comprising the one or more past interactions of the target user with the content item;
   determine, by the online system, a second measure of likelihood that the target user would perform less than a threshold amount of activities on the particular third party website after accessing the particular third party website, the second measure of likelihood determined based on a second set of features comprising the one or more characteristics of the client device;
   generate, by the online system, a prefetch instruction based on factors comprising the determined first measure of likelihood and the second measure of likelihood, the prefetch instruction configured to instruct the client device whether to prefetch data, by the client device, from the particular third party website before the target user accesses the URL; and
   send, by the online system, the prefetch instruction along with the content item to the client device associated with the target user, the client device configured to prefetch data from the particular third party website before the target user accesses the content item in accordance with the prefetch instruction.

13. The non-transitory computer readable medium of claim 12, wherein the user interactions associated with the content item comprise accessing the particular third party website via the URL included in the content item.

14. The non-transitory computer readable medium of claim 12, wherein the computer program instructions for determining the first measure of likelihood that the target user would access the particular third party website via the URL in perform the user interaction associated with the content item comprise instructions that when executed cause the computer processor to:
   input the first set of features into one or more machine learning based models, the one or more machine learning based models outputting the first measure of likelihood.

15. The non-transitory computer readable medium of claim 12, wherein the computer program instructions for determining the second measure of likelihood that the user would perform less than the threshold amount of activities on the particular third party website after accessing the particular third party website comprise instructions that when executed cause the computer processor to:
   input the second set of features into one or more trained models, the one or more trained models outputting the second measure of likelihood.

16. The non-transitory computer readable medium of claim 12, wherein the computer program instructions for generating the prefetch instruction based on factors comprising the determined first measure of likelihood and the second measure of likelihood comprise instructions that when executed cause the computer processor to:
   compare the first measure of likelihood with a first threshold value;
   compare the second measure likelihood with a second threshold value; and
   generate the prefetch instruction for prefetching data from the particular third party website based on the result of the first comparison or the second comparison.

17. The non-transitory computer readable medium of claim 12, wherein the data prefetched from the particular third party website comprises resources of a web page of the particular third party website, the web page associated with the URL comprised in the content item sent to the client device.

* * * * *

UNITED STATES PATENT AND TRADEMARK OFFICE
CERTIFICATE OF CORRECTION

PATENT NO. : 11,210,363 B1
APPLICATION NO. : 15/963250
DATED : December 28, 2021
INVENTOR(S) : Dihong Gao et al.

It is certified that error appears in the above-identified patent and that said Letters Patent is hereby corrected as shown below:

On the Title Page

Item (57), under Abstract, Line 13, delete "here" and insert -- there --, therefor.

Signed and Sealed this
Thirtieth Day of August, 2022

Katherine Kelly Vidal
*Director of the United States Patent and Trademark Office*